United States Patent
Danilychev

(10) Patent No.: US 12,236,074 B2
(45) Date of Patent: Feb. 25, 2025

(54) PREVENTING INFORMATION LEAKAGE FROM STALE LIVE PREVIEWS

(71) Applicant: Omnissa, LLC, Mountain View, CA (US)

(72) Inventor: Alexander V. Danilychev, Irvine, CA (US)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 18/329,823

(22) Filed: Jun. 6, 2023

(65) Prior Publication Data

US 2024/0411436 A1    Dec. 12, 2024

(51) Int. Cl.
*G06F 17/00* (2019.01)
*G06F 3/04817* (2022.01)
*G06F 3/04845* (2022.01)

(52) U.S. Cl.
CPC ...... *G06F 3/04845* (2013.01); *G06F 3/04817* (2013.01)

(58) Field of Classification Search
CPC ............... G06F 3/04845; G06F 3/04817
See application file for complete search history.

(56) References Cited

U.S. PATENT DOCUMENTS

| | | | | |
|---|---|---|---|---|
| 9,047,472 B2* | 6/2015 | Riordan | ................ | G06F 21/84 |
| 10,198,143 B2* | 2/2019 | Desai | ................ | G06F 3/0481 |
| 2003/0117440 A1* | 6/2003 | Hellyar | ................ | G06F 3/0489 |
| | | | | 715/767 |
| 2006/0129948 A1* | 6/2006 | Hamzy | ................ | G06F 21/84 |
| | | | | 715/790 |
| 2010/0064251 A1* | 3/2010 | Hufnagel | ................ | G06F 3/0481 |
| | | | | 715/788 |
| 2010/0313165 A1* | 12/2010 | Louch | ................ | G06F 9/451 |
| | | | | 715/792 |
| 2015/0161970 A1* | 6/2015 | Sunkara | ................ | G09G 5/14 |
| | | | | 345/634 |
| 2015/0277670 A1* | 10/2015 | Louch | ................ | G06F 3/04847 |
| | | | | 715/794 |
| 2019/0156071 A1* | 5/2019 | Kaladgi | ................ | H04M 1/72403 |
| 2022/0244838 A1* | 8/2022 | Bereza | ................ | G06T 19/20 |
| 2022/0365740 A1* | 11/2022 | Chang | ................ | G06F 3/0488 |

FOREIGN PATENT DOCUMENTS

| | | | | |
|---|---|---|---|---|
| CN | 109164958 A | * | 1/2019 | |
| CN | 108762613 B | * | 2/2021 | ......... G06F 3/04817 |
| CN | 114089887 A | * | 2/2022 | |
| CN | 116820288 A | * | 9/2023 | |
| CN | 116954427 A | * | 10/2023 | |
| WO | WO-2018212801 A1 | * | 11/2018 | ......... G06F 1/1686 |
| WO | WO-2018213423 A1 | * | 11/2018 | ......... G02F 1/13338 |

* cited by examiner

*Primary Examiner* — Laurie A Ries
(74) *Attorney, Agent, or Firm* — Kim & Stewart LLP

(57) ABSTRACT

In one set of embodiments, a computer system can determine that a window for an application running on the computer system has become locked by the application while the window is minimized. In response, the computer system can change a preview image associated with the application to an icon or to a different image. Further, after changing the preview image, the computer system can determine that the window has been restored or maximized. In response, the computer system can cause the preview image to once again reflect a current visual state of the window.

21 Claims, 5 Drawing Sheets

PREVENTING INFORMATION LEAKAGE FROM STALE LIVE PREVIEWS

BACKGROUND

Unless otherwise indicated, the subject matter described in this section should not be construed as prior art to the claims of the present application and is not admitted as being prior art by inclusion in this section.

Microsoft Windows™ (hereinafter "Windows") and other similar desktop operating systems (OSs) present applications to users in the form of graphical windows that are rendered (i.e., painted) on a desktop. In recent versions of Windows, each application window is associated with a preview image that a user can view by, e.g., hovering their mouse pointer over the window's taskbar button. This preview image, also known as a live preview, is intended to be a live (i.e., real-time) representation of the window's current visual state/content and thus is updated whenever the window is repainted onscreen so that it is consistent, or in other words in sync, with the window.

One issue with the live preview feature is that, when a window is minimized (i.e., collapsed or hidden from view on the desktop, such that only its taskbar button is visible), the window's live preview is frozen from the point of the minimize event and stays frozen as long as the window remains minimized. As a result, the live preview will become outdated (i.e., stale) if the content of the window changes while the window is in the minimized state. Such stale live previews can potentially lead to the leakage of private information, particularly in scenarios where multiple users access the same desktop.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof.

1. Problem Description and Solution Overview

Embodiments of the present disclosure pertain to a framework for preventing information leakage that may arise from stale application window preview images (i.e., stale live previews) in Windows and other desktop OSs. The following subsections elaborate upon how live previews may become stale, describe an example scenario where a stale live preview leads to the leakage of private information, and summarize several solution approaches for addressing this leakage.

1.1 Stale Live Previews

Figure 1A:
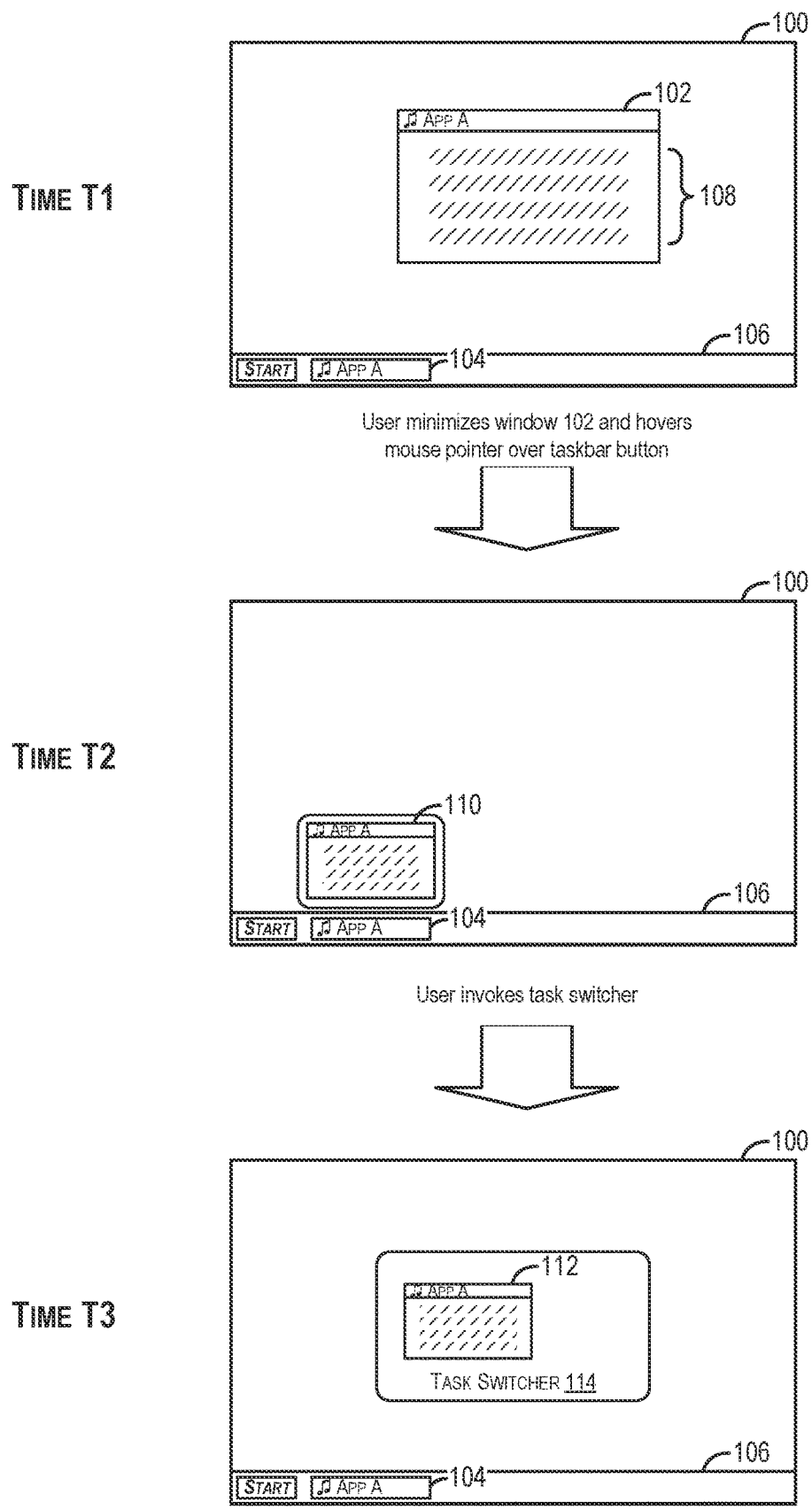
FIGS. 1A and 1B provide examples of how live previews work in recent versions of Windows.

As noted in the Background section, recent Windows versions implement a live preview feature for application windows that involves (1) creating a preview image (i.e., live preview) for each open window, (2) updating the live preview whenever its associated window is painted or repainted on the Windows desktop (thereby keeping the live preview in sync with the window's current visual state/content), and (3) presenting the live preview to a desktop user in response to certain actions (e.g., hovering a mouse pointer over the window's taskbar button, bringing up a task switcher user interface (UI), etc.). To illustrate how this live preview feature works from the user's perspective, FIG. 1A depicts an example Windows desktop 100 comprising an open (i.e., running) application window 102 and in particular depicts the state of this desktop at three time points T1, T2, and T3. Note that application window 102 has a corresponding taskbar button 104 on a taskbar 106 of desktop 100 that displays an icon of the application to which the window belongs and the window's title bar text ("App A").

At time T1 of FIG. 1A, application window 102 is painted (i.e., rendered) on desktop 100 in a non-minimized state and thus the window's current content 108 is visible to the desktop user.

At time T2, the user minimizes application window 102 to taskbar 106 and hovers their mouse pointer over the window's taskbar button 104. As a result, window 102 itself is no longer painted on desktop 100; instead, a thumbnail of the window's live preview (reference numeral 110) is presented above taskbar button 104. Live preview thumbnail 110 includes the same content 108 that was shown in application window 102 prior to being minimized (i.e., at time T1).

And at time T3, the user invokes the Windows task switcher by, e.g., entering the Alt+Tab key combination. This causes another thumbnail of window 102's live preview (reference numeral 112) to be presented within a task switcher UI 114. Like taskbar live preview thumbnail 110 shown at time T2, this task switcher live preview thumbnail includes the same content 108 shown in application window 102 prior to being minimized.

As mentioned previously, one quirk of Windows' live preview feature is that, when an application window is minimized, the window's associated live preview is no longer synchronized with the window's current visual state. Instead, the live preview is frozen/snapshotted as of the time of the minimize event (or in other words, retains the visual state of the window as it existed upon being minimized) and remains in that frozen/snapshotted state until the window is restored (i.e., returned to a normal, non-minimized state) or maximized (i.e., enlarged to visibly fill the entirety of the desktop). This occurs because minimized windows are not painted on the desktop and thus do not trigger live preview updates.

Figure 1B:
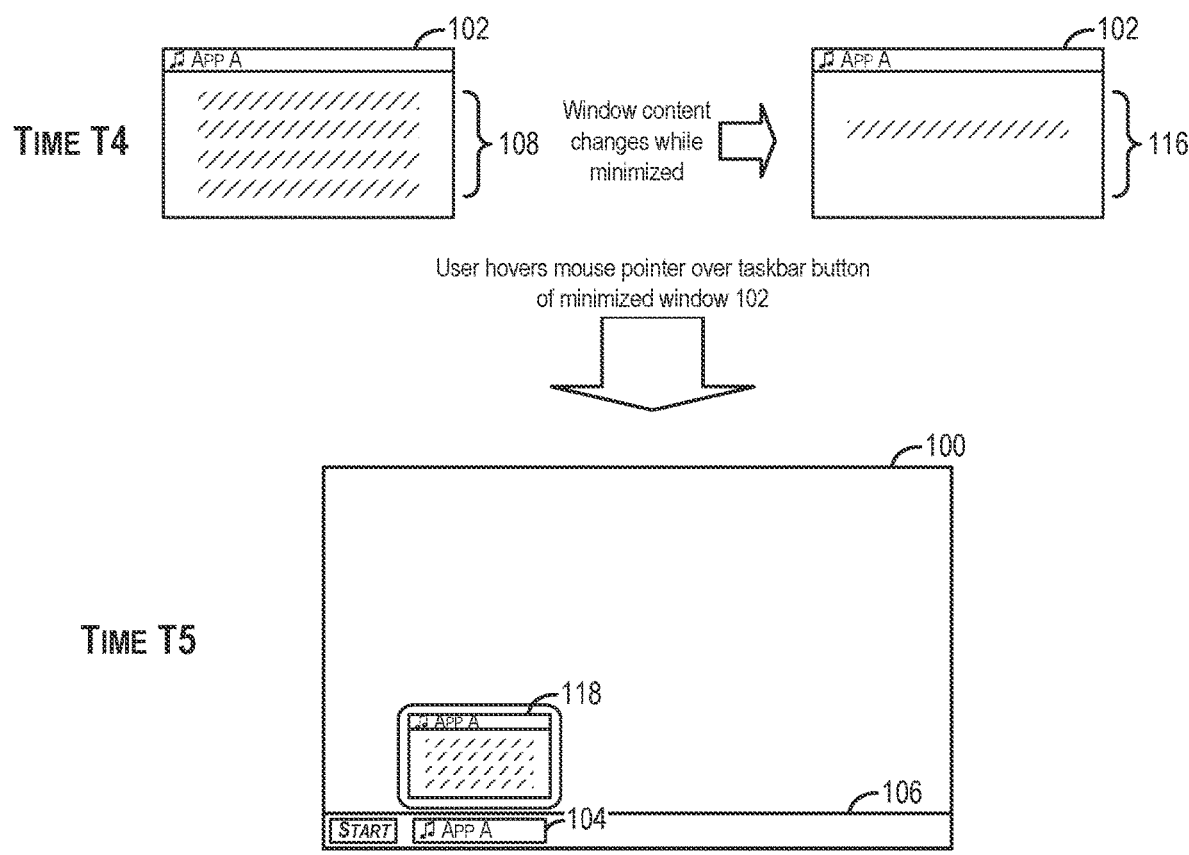

A consequence of this quirk is that the live preview will become stale if the window's content changes while minimized. For example, FIG. 1B depicts a continuation of the time sequence of FIG. 1A involving two subsequent time points T4 and T5. At time T4, the content of application window 102 changes from content 108 to content 116 while the window is minimized (this is not visible to the desktop user). And at time T5, the user once again hovers their mouse pointer over the minimized window's taskbar button 104 on desktop 100, resulting in the presentation of another live preview thumbnail 118 for window 102 above taskbar button 104. As shown here, thumbnail 118 still includes original window content 108 from time T1 rather than latest window content 116 introduced at time T4 because the window's live preview was frozen as of the time of the minimize event (i.e., T2). Accordingly, thumbnail 118 is stale and will only be updated again once application window 102 is restored/maximized and thereby repainted on desktop 100.

1.2 Information Leakage Scenario

Figure 2:
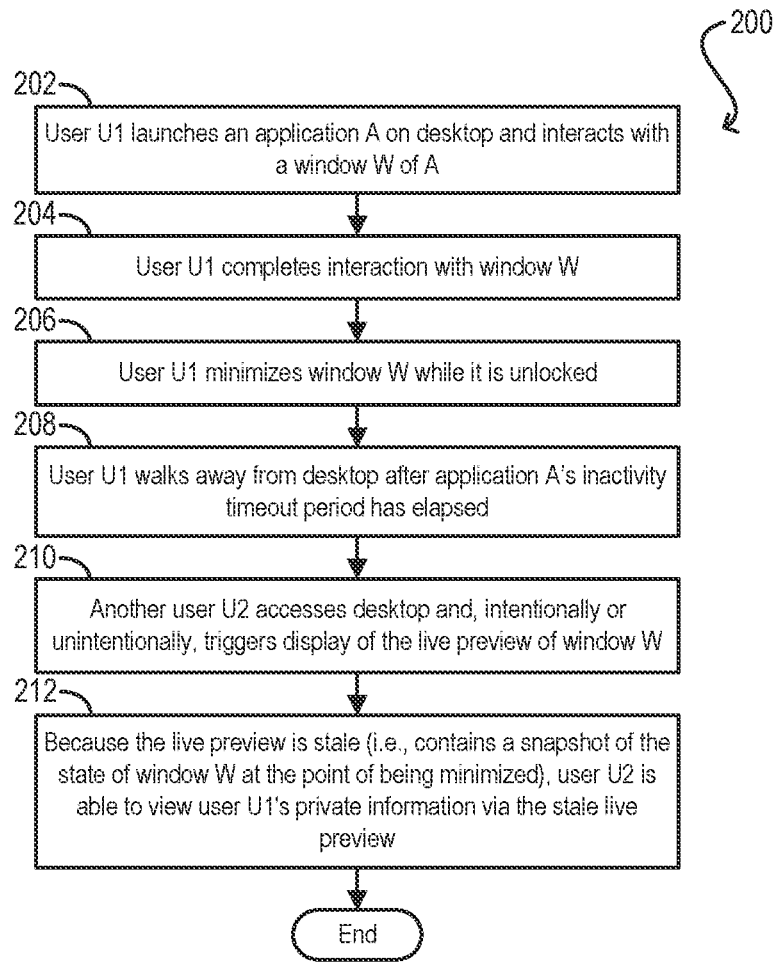
FIG. 2 depicts a flowchart of a scenario in which a stale live preview leads to information leakage.

With the foregoing explanation of stale live previews in mind, FIG. 2 depicts a flowchart 200 of an example scenario in which a stale live preview causes the private (e.g., confidential, sensitive, and/or personal) information of one desktop user to be inadvertently revealed (i.e., leaked) to another desktop user.

Starting with step 202, a first user U1 of a Windows desktop launches an application A on the desktop and interacts with a window W of application A. For the purposes of this scenario, it is assumed that the content shown in window W includes private information that is intended for viewing only by user U1. For example, application A may be a remote desktop client and the content shown in window W may be a confidential work desktop of user U1. As another example, application A may be a web browser and the content shown in window W may be a banking webpage that includes the details of one or more financial accounts of user U1.

Further, to protect the privacy of user U1 and other application users, it is assumed that application A is programmed to automatically "lock" window W after some period of user inactivity (i.e., an inactivity timeout period). This lock mechanism can include, e.g., changing the visual state of the window to hide any private information presented therein and instead display a lock message and a prompt to unlock the window by, e.g., entering a set of user credentials.

Because user U1 is aware that application A implements this window lock functionality, at steps 204-208 user U1 completes their interaction with window W, minimizes W while it is unlocked, and eventually walks away from the desktop after the application's inactivity timeout period has elapsed. User U1 performs these actions knowing that window W is now locked and thus presumes that other desktop users cannot view the content of window W.

However, at step 210, another user U2 accesses the desktop and, either intentionally or unintentionally, triggers the display of the live preview of minimized window W. For example, user U2 may hover their mouse pointer over window W's taskbar button and trigger the display of its taskbar live preview thumbnail, or alternatively invoke the Windows Alt+Tab task switcher and trigger the display of W's task switcher live preview thumbnail. Due to the stale live preview issue explained above, the live preview displayed at step 210 contains a snapshot of the visual state of window W at the time W was minimized, which occurred before the window was locked (i.e., at step 206), rather than the window's current locked state. Accordingly, user U2 can freely view any private information pertaining to user U1 that may be shown in that live preview (step 212), which is a significant security issue.

1.3 Solution Approaches

To address this and other similar problems, embodiments of the present disclosure provide a novel framework for preventing the leakage of information from the stale live previews of application windows. This framework can be implemented in program code (i.e., software) that runs on a general-purpose computer system, in hardware, or as a combination thereof. For example, in the case of software, the framework can be implemented as part of the application that creates the application windows or as a standalone application.

According to one set of embodiments, the framework can employ a solution approach referred to herein as "iconize upon lock" that checks, for each application window that is at risk of leaking information (i.e., each "target" window), whether a lock event is detected for that window while the window is minimized. If the answer is yes, the framework can invoke a Windows Desktop Window Manager (DWM) API (e.g., DWMSetWindowAttribute) that changes the target window's existing live preview to an iconic representation, and more specifically to the default icon of the application that owns the window. Alternatively, the framework can invoke one or more Windows DWM APIs for swapping out the target window's existing live preview with a custom icon or a custom image. Then, when the target window is restored or maximized, the framework can revert the iconization of the window's live preview such that it is once again synchronized with the window's content per conventional live preview behavior.

According to another set of embodiments, the framework can employ a solution approach referred to herein as the "ghost window" approach that creates an additional ghost (i.e., dummy) window for each target window. This ghost window does not contain any meaningful content and is invisible to the desktop user while its corresponding target window is not minimized. When the target window does become minimized, the framework can hide the target window and its taskbar button and simultaneously make the ghost window visible in a minimized state (which includes showing the ghost window's taskbar button on the taskbar). This achieves two goals: (1) it creates the illusion that the ghost window's taskbar button is actually the taskbar button for the minimized target window (assuming they share the same icon and title bar text, and any associated menus, so that thumbnail interactions are not impeded with this change); and (2) if the desktop user attempts to view the target window's live preview by, e.g., hovering over the taskbar or invoking the task switcher, the user will see the live preview of the ghost window (which will not expose any private information), rather than the stale live preview of the target window. Then, when the user attempts to restore or maximize the ghost window, the framework can once again hide the ghost window and make the target window visible in the requested restored or maximized state.

With either of these solution approaches, the framework of the present disclosure can advantageously prevent minimized windows from leaking information to unauthorized users via stale live previews, while at the same time allowing those windows to exhibit normal live preview functionality when in a non-minimized or maximized state. It should be noted that in some situations it may be preferable to employ the iconize upon lock approach over the ghost window approach or vice versa. For example, one benefit specific to the iconize upon lock approach is that it completely replaces the target window's existing (stale) live preview with an iconic representation or custom image. Accordingly, this approach is not susceptible to malicious actors that may attempt to use programmatic methods (e.g., calls to certain Windows DWM APIs) to access the stale live preview, even if it is hidden on the desktop.

Another benefit of the iconize upon lock approach is that it can be easily implemented as an external application, rather than as part of the application that creates/owns the target window, because Windows DWM APIs generally allow one application to access and modify the live previews of other applications. In contrast, the ghost window approach works best if implemented in the application that creates/owns the target window due to complexities with ensuring that the ghost window's taskbar button exactly matches the target window's taskbar button.

On the other hand, a benefit specific to the ghost window approach is that it is not dependent on Windows DWM APIs for its implementation, unlike iconize upon lock. Accordingly, the ghost window approach does not need to be re-implemented if, e.g., those APIs are changed in the future.

The remaining sections of the present disclosure provide additional details for implementing the iconize upon lock and ghost window approaches according to certain embodiments. It should be appreciated that the foregoing description of these solution approaches is illustrative and not intended to limit embodiments of the present disclosure. For example, while the foregoing description focuses on Windows, the techniques described herein can also be applied to other desktop OSs that suffer from the same or similar stale live preview issue. Accordingly, all references to Windows can be interchangeably replaced with references to such other OSs and all references to Windows DWM APIs can be interchangeably replaced with references to appropriate desktop window management APIs provided by such other OSs. One of ordinary skill in the art will recognize other variations, modifications, and alternatives.

2. Iconize Upon Lock Implementation

Figure 3:
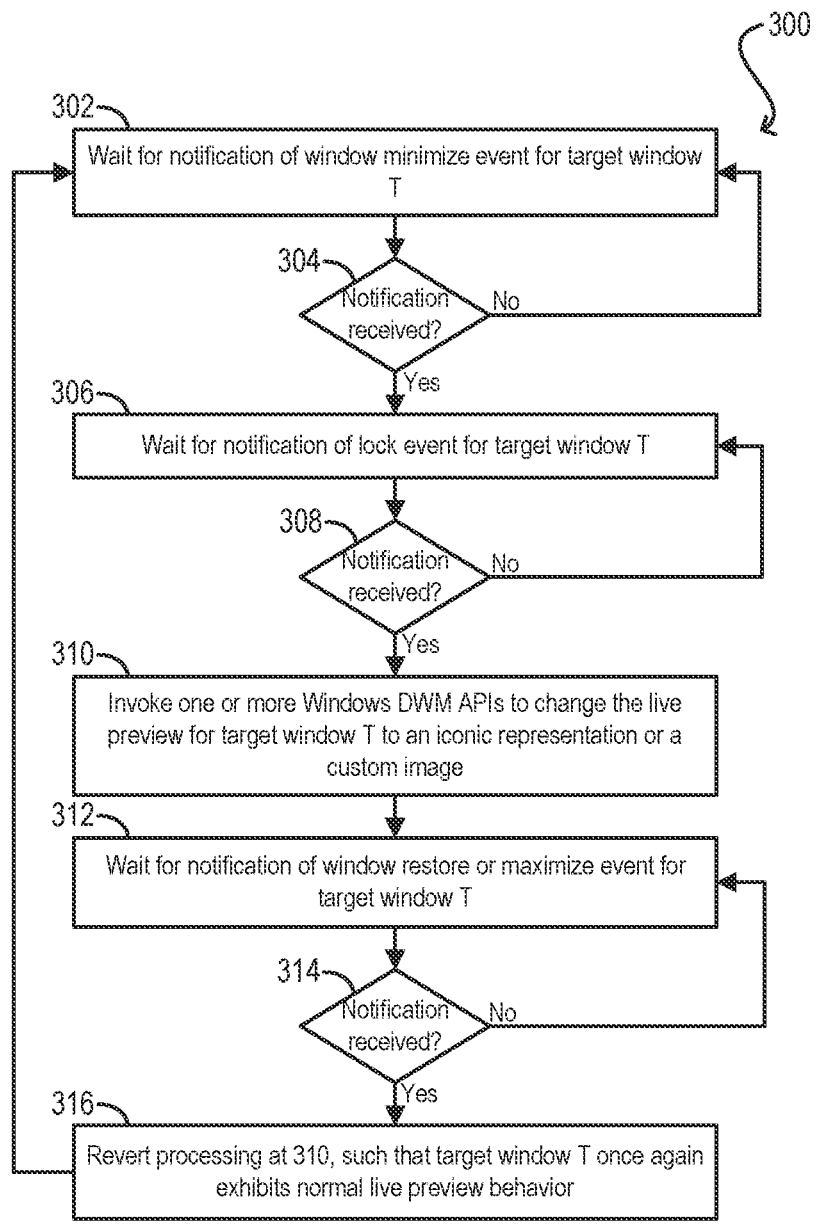
FIG. 3 depicts a flowchart for implementing the iconize upon lock approach of the present disclosure according to certain embodiments.

FIG. 3 depicts a flowchart 300 that may be implemented by the framework of the present disclosure using the iconize upon lock approach for preventing information leakage from the stale live preview of a target window T according to certain embodiments. As mentioned previously, this logic may be implemented as part of the application that owns/creates target window T (i.e., T's "host application") or as a separate and standalone application.

Starting with step 302, the framework can monitor the status of target window T and wait for a notification message (from, e.g., Windows) indicating that T has been minimized. As long as no such notification message is received, the framework can continue waiting (step 304).

Upon receiving a notification of a window minimize event with respect to target window T, the framework can proceed to wait for a notification message that T has been locked by its host application while T is minimized (step 306). In embodiments where the framework is implemented as part of this host application, the framework will have direct access to this information. In embodiments where the framework is implemented as a separate application, it is assumed that the framework is configured to receive this information from the host application via some inter-application communication mechanism, such as an inter-process communication (IPC) call.

As long as the framework does not receive a lock notification while target window T is minimized, it can continue waiting for one (step 308). However, upon receiving this lock notification, the framework can invoke one or more Windows DWM APIs to change the live preview for target window T from its current state (which will include the content of T at the time of the minimize event) to an iconic representation, such as the default application icon of T's host application, or to a custom image (step 310). For example, in a particular embodiment the following DWM code can be used to change the live preview to the default application icon:

int result=DwmSetWindowAttribute (hWnd, DWMWINDOWATTRIBUTE. ForceIconicRepresentation, true, sizeof (int));

Listing 1

One reason to change the live preview to a custom icon or image (rather than the default application icon) is that a custom icon/image can potentially convey additional useful information to the desktop user. For example, in one set of embodiments, the framework may replace the live preview with a custom image indicating that target window T is currently locked, thereby allowing the user to see this at a glance by, e.g., hovering over the window's taskbar button.

Upon changing the live preview at step 310, the framework can wait for a notification message (from, e.g., Windows) indicating that target window T has been restored or maximized (steps 312 and 314). In response to receiving such a notification, the framework can invoke one or more Windows DWM APIs to reverse the live preview iconization performed at step 310, or in other words revert target window T so that it exhibits normal live preview behavior (step 316). This will cause Windows to create a new live preview for target window T that is synchronized with its restored or maximized state and thus displays the current content of T.

Finally, upon completing step 316, the framework can return to step 302 in order to repeat the process if target window T is minimized and locked again.

It should be noted that flowchart 300 illustrates one possible implementation of the iconize upon lock approach and various modifications are possible. For example, in certain embodiments, rather than waiting for a lock notification from the host application at steps 306 and 308, the framework can instead start an internal timer from the time of receiving the minimize notification and automatically proceed to step 310 once the timer expires. This is useful in scenarios where, e.g., the framework is implemented as a standalone application and there is no mechanism for the framework to receive lock notifications from the host application.

3. Ghost Window Implementation

Figure 4:
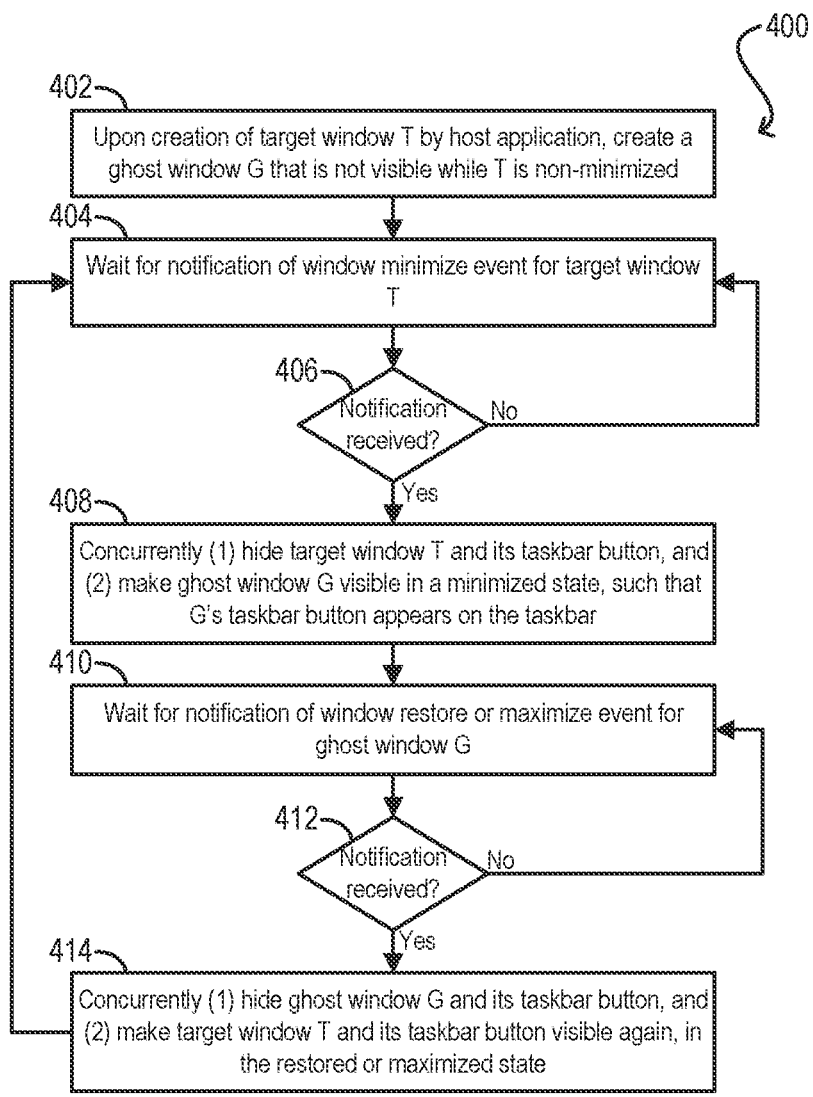
FIG. 4 depicts a flowchart for implementing the ghost window approach of the present disclosure according to certain embodiments.

FIG. 4 depicts a flowchart 400 that may be implemented by the framework of the present disclosure using the ghost window approach for preventing information leakage from the stale live preview of a target window T according to certain embodiments. Like the iconize upon lock approach, this logic may be implemented as part of the host application of target window T or as a separate and standalone application.

Starting with step 402, upon creation of target window T by the host application, the framework can create a ghost window G corresponding to T that shares the same application icon and title bar text but does not contain any meaningful content and is not visible while T is non-minimized.

At step 404, the framework can monitor the status of target window T and wait for a notification message (from, e.g., Windows) indicating that T has been minimized. As long as no such notification message is received, the framework can continue waiting (step 406).

Upon receiving a notification of a window minimize event with respect to target window T, the framework can concurrently (1) hide T and its taskbar button, such that they no longer appear on the desktop, and (2) make ghost window G visible in a minimized state, such that G's taskbar button appears on the taskbar (step 408). As mentioned previously, this creates the illusion that target window T has been minimized because ghost window G's taskbar button appears identical to T's taskbar button. However, in reality, target window T has been completely hidden from view and replaced by a minimized version of ghost window G.

This also means that if the desktop user attempts to view target window T's live preview by hovering over the taskbar or invoking the task switcher, the user will see the live preview of ghost window G instead, which does not contain any private information. For example, the live preview of ghost window G may simply be the default icon of the host application or some other icon or image.

Upon swapping visibility of the target and ghost windows at step 408, the framework can wait for a notification message (from, e.g., Windows) indicating that ghost window G has been restored or maximized (steps 410 and 412). In response to receiving such a notification, the framework can concurrently (1) hide ghost window G and its taskbar button, and (2) make target window T and its taskbar button visible again, in the restored or minimized state (step 414).

Finally, upon completing step 414, the framework can return to step 404 in order to repeat the process if target window T is minimized again.

It should be noted that flowchart 400 illustrates one possible implementation of the ghost window approach and various modifications are possible. For example, in certain embodiments, upon making ghost window G visible in response to the minimization of target window T, the framework can change the live preview of G to mirror the live preview of T. This will not result in any information leakage because target window T has not been locked yet. Then, when target window T is actually locked by the host application, the framework can change the live preview of G again to the host application's default icon or a custom icon/image that does not reveal any private information.

Certain embodiments described herein can employ various computer-implemented operations involving data stored in computer systems. For example, these operations can require physical manipulation of physical quantities-usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
   determining, by a computer system, that a window for an application running on the computer system has become locked by the application while the window is minimized;
   in response to determining that the window has become locked while minimized, changing, by the computer system, a preview image associated with the application to an icon or to a different image;
   after the changing, determining, by the computer system, that the window has been restored or maximized; and
   in response to determining that the window has been restored or maximized, causing, by the computer system, the preview image to reflect a current visual state of the window.

2. The method of claim 1 wherein the changing comprises:
   calling a desktop window management application programming interface (API) exposed by an operating system of the computer system.

3. The method of claim 1 wherein changing the preview image associated with the application further comprises changing the preview image to a default icon associated with the application.

4. The method of claim 1 wherein determining that the window has become locked while minimized comprises:
   receiving a notification message from the application indicating that the application has locked the window.

5. The method of claim 1 wherein determining that the window has become locked while minimized comprises:
   initiating a timer upon determining that the window has become minimized; and
   determining that the window has become locked upon expiration of the timer.

6. The method of claim 1 further comprising:
   upon creation of another window of the application, creating a ghost window corresponding to said another window that is not visible to users of the computer system while said another window is non-minimized;
   determining that said another window has become minimized; and
   in response to the determining, concurrently:
      hiding said another window and a taskbar button of said another window; and
      making the ghost window visible in a minimized state.

7. The method of claim 6 further comprising:
   determining that the ghost window has been restored or maximized; and
   in response to the determining, concurrently:
      hiding the ghost window and a taskbar button of the ghost window; and
      making said another window and the taskbar button of said another window visible in a restored or maximized state.

8. A non-transitory computer readable storage medium having stored thereon program code executable by a computer system, the program code causing the computer system to execute a method comprising:
   determining that a window for an application running on the computer system has become locked by the application while the window is minimized;
   in response to determining that the window has become locked while minimized, changing a preview image associated with the application to an icon or to a different image;
   after the changing, determining that the window has been restored or maximized; and
   in response to determining that the window has been restored or maximized, causing the preview image to reflect a current visual state of the window.

9. The non-transitory computer readable storage medium of claim 8 wherein the changing comprises:
   calling a desktop window management application programming interface (API) exposed by an operating system of the computer system.

10. The non-transitory computer readable storage medium of claim 8 wherein changing the preview image associated with the application further comprises changing the preview image to a default icon associated with the application.

11. The non-transitory computer readable storage medium of claim 8 wherein determining that the window has become locked while minimized comprises:
    receiving a notification message from the application indicating that the application has locked the window.

12. The non-transitory computer readable storage medium of claim 8 wherein determining that the window has become locked while minimized comprises:
    initiating a timer upon determining that the window has become minimized; and
    determining that the window has become locked upon expiration of the timer.

13. The non-transitory computer readable storage medium of claim 8 wherein the method further comprises:
    upon creation of another window of the application, creating a ghost window corresponding to said another window that is not visible to users of the computer system while said another window is non-minimized;
    determining that said another window has become minimized; and
    in response to the determining, concurrently:
       hiding said another window and a taskbar button of said another window; and
       making the ghost window visible in a minimized state.

14. The non-transitory computer readable storage medium of claim 13 wherein the method further comprises:
    determining that the ghost window has been restored or maximized; and
    in response to the determining, concurrently:
       hiding the ghost window and a taskbar button of the ghost window; and
       making said another window and the taskbar button of said another window visible in a restored or maximized state.

15. A computer system comprising:
    a processor; and
    a non-transitory computer readable medium having stored thereon program code that, when executed, causes the processor to:
       determine that a window for an application running on the computer system has become locked by the application while the window is minimized;
       in response to determining that the window has become locked while minimized, change a preview image associated with the application to an icon or to a different image;
       after the changing, determine that the window has been restored or maximized; and
       in response to determining that the window has been restored or maximized, cause the preview image to reflect a current visual state of the window.

16. The computer system of claim 15 wherein the program code that causes the processor to change the preview image comprises program code that causes the processor to:
    call a desktop window management application programming interface (API) exposed by an operating system of the computer system.

17. The computer system of claim 15 wherein changing the preview image associated with the application further comprises changing the preview image to a default icon associated with the application.

18. The computer system of claim 15 wherein the program code that causes the processor to determine that the window has become locked while minimized comprises program code that causes the processor to:
    receive a notification message from the application indicating that the application has locked the window.

19. The computer system of claim 15 wherein the program code that causes the processor to determine that the window has become locked while minimized comprises program code that causes the processor to:
    initiate a timer upon determining that the window has become minimized; and
    determine that the window has become locked upon expiration of the timer.

20. The computer system of claim 15 wherein the program code further causes the processor to:
    upon creation of another window of the application, create a ghost window corresponding to said another window that is not visible to users of the computer system while said another window is non-minimized;
    determine that said another window has become minimized; and in response to the determining, concurrently:
   hide said another window and a taskbar button of said another window; and
   make the ghost window visible in a minimized state.

21. The computer system of claim 20 wherein the program code further causes the processor to:
   determine that the ghost window has been restored or maximized; and
   in response to the determining, concurrently:
      hide the ghost window and a taskbar button of the ghost window; and
   make said another window and the taskbar button of said another window visible in a restored or maximized state.

\* \* \* \* \*